United States Patent Office 2,838,368
Patented June 10, 1958

2,838,368
TREATMENT OF AMMONIUM NITRATE SOLUTIONS

Thomas William Boyer, John George MacHutchin, and Leo Yaffe, Deep River, Canada, assignors, by mesne assignments, to the United States of America as represented by the United States Atomic Energy Commission No Drawing. Application June 28, 1948
Serial No. 35,746

6 Claims. (Cl. 23—14.5)

This invention relates to the treatment of solutions containing ammonium nitrate, in particular to the treatment of residual solutions obtained in the treatment of neutron irradiated uranium and containing fission products as well as ammonium nitrate.

The residual solutions referred to result from the treatment of nitrate solutions of irradiated uranium to which ammonium nitrate has been added prior to treatment with organic solvents for the separation of plutonium from the uranium. These residual solutions present a problem for storage and disposal owing to their high contents of radioactivity and ammonium nitrate.

It is an object, therefore, of this invention to provide a method whereby the ammonium nitrate is destroyed and removed from the residual aqueous solutions so as to permit subsequent concentration of the residual solution containing radioactive fission products. More specifically stated, the object is to provide a method of treating such solutions for the production of a relatively small volume of material, containing the radioactive fission products.

An origin of the solutions to be treated according to this invention may be illustrated as follows.

A metallic uranium rod usually weighing 54.5 kg., sheathed in aluminum and irradiated sufficiently in a pile and stored subsequently so that a portion of its radioactivity is dissipated, may contain say 9 grams plutonium, 14 grams of fission products and may have a radioactivity of around 5,000 to 10,000 curies. After removal of the aluminum sheath by caustic solution, the rod is dissolved in nitric acid and the resulting solution, adjusted to the proper acidity and substantially saturated at room temperature with ammonium nitrate, is subjected to solvent extraction to remove all but traces of plutonium. Following extraction by the organic solvent the solution from one rod is about 600 litres which may contain approximately:

| | |
|---|---|
| Uranyl nitrate | kg.  90 |
| Fission products | grams  14 |
| Ammonium nitrate | kg.  390 |
| Nitric acid | kg.  75 |
| Water | kg.  390 |

Activity 5,000 to 10,000 curies $\beta$, $\gamma$.

It is thus apparent that the storage and disposal of these solutions presents a problem.

When as in this example the solution contains uranyl nitrate it is preferable to first remove it by solvent extraction. For this purpose diethyl ether or methylisobutylketone may be used. Prior to treatment with the solvent the solution is neutralized with ammonium hydroxide or the like to avoid extraction, by the solvent, of fission products. After removing the solvent extract the residual solution of the example will approximate 700 litres containing about 486 kg. ammonium nitrate
411 kg. water
14 grams of fission products, and traces of uranium, plutonium, ether or other organic solvent In accordance with the invention such residual nitrate solutions are treated with an excess of alkyl acid anhydride, such as acetic, propionic and butyric anhydride. Acetic anhydride is preferred. Substantially dry ammonium nitrate may be reacted with the reagent to produce nitrous oxide.

It has been found that a rapid, smooth reaction occurs when the residual nitrate solution is added to an excess of the acetic anhydride above the theoretical of about 40–50%. The nitrate solution is slowly added to the reagent, and preferably at such rate that external heat is not required. Towards the end of the treatment the reacting mass is preferably heated for a few minutes to ensure complete destruction and transformation of the ammonium nitrate. Then the resulting liquor is distilled to or near dryness conveniently at atmospheric pressure. The fission products remain in small volume of acetic anhydride-acetic acid mixture.

The reaction is thought to proceed at least partially as follows:

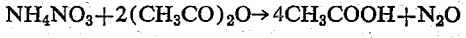

while water present in the residual solution reacts as follows:

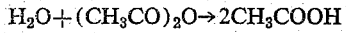

Some acetamide was found in the distillation residue. Similarly when propionic or butyric anhydrides are used the homologous amides are formed. They may be destroyed by diluting the residue with water, adding a small amount of nitric acid, and distilling the mixture, thus apparently hydrolyzing the amide with formation of a portion of ammonium nitrate. This may be destroyed by retreatment with the anhydride and nitric acid as described until the desired low volume is obtained.

Alternatively the amide in the distillation residues may be destroyed by cooling the residue adding nitrogen dioxide, and distilling while continuing to add the nitrogen dioxide. Anhydride must be present in the solution, otherwise undesirable side reactions occur with the formation of ammonium nitrate. Water generated in the reaction reacts with the excess anhydride so that the mixture is maintained essentially anhydrous.

The following specific examples are illustrative of the operation of the invention.

(1) 472 ml. of acetic anhydride were refluxed in a 2-liter, 3-necked flask which was fitted with a 100 ml. dropping funnel containing 75 ml. of residual solution obtained in the treatment of the rods and saturated in ammonium nitrate at room temperature and which had a total $\beta$-activity of $1.3 \times 10^{10}$ counts per minute. A reflux condenser was attached to another neck of the flask and a thermometer was inserted in the third opening. The residual solution was added slowly to the hot anhydride. The temperature, initially at 139° C. fell to 118° C. and the solution was refluxed for 1 hour at 118° C. to transform all of the nitrate.

Next the reflux condenser was replaced by a 30 cm. "Vigreaux" column leading to a "Liebig" condenser and distillation carried out at about 4 ml. per minute. The volume of distillate was 483 ml. having a total activity of less than one one-millionth of the original, and containing 10% of anhydride by weight. The residues were 43 ml. These were transferred to a dropping funnel and thence added to 15 ml. of water and 5 ml. of 70% nitric acid was added. Distillation yielded 50 ml. of distillate and 13 ml. of residues. The activity in this distillate was less than one ten-thousandth of the original.

To these residues were added 30 ml. of acetic anhydride and the mixture refluxed for 15 minutes. The distillate was 30 ml. having a total activity of less than one one hundred thousandth of the original and the volume of residues was 10 ml. To these last residues was added 5 ml. of water to hydrolyze the acetic anhydride and then 5 ml. of 70% nitric acid was added to hydrolyze the acetamide. This mixture was concentrated by distillation to yield 19 ml. of distillate containing a total activity of less than one one-hundred thousandth of the original and a residue of 1 ml. The overall concentration factor is 75, but further repetition of the above procedure can increase this factor.

(2) Alternatively the residual solution from the rod treatment may be treated as follows. The residual solution was slowly added to a 50% excess of boiling acetic anhydride and the mixture was refluxed for ½ to 1 hour. The solution resulting was distilled to about $\frac{1}{10}$ of the original volume and cooled. About three times the amount of nitrogen dioxide theoretically required was passed into the solution, about $\frac{1}{10}$ of its volume of water was added and the mixture distilled to yield a residual volume of about $\frac{1}{75}$ of the original rod solution. The distillate contained less than one one-hundred thousandth of the original radioactivity.

What is claimed is:

1. A method of treating aqueous solutions containing ammonium nitrate and fission products which comprises slowly adding the solution to an excess of lower fatty acid anhydride beyond that required to form a fatty acid with all the water present, heating the mixture to complete destruction of the ammonium nitrate, and distilling the mixture to substantial dryness.

2. The method defined in claim 1 wherein the fatty acid anhydride is used in 40–50% excess of the theoretical amount required to hydrate the anhydride.

3. The method defined in claim 1 wherein the solution is added to an excess of hot anhydride.

4. The method defined in claim 1 wherein the distillation residue containing small volume of the fatty acid and its anhydride is distilled in the presence of nitric acid.

5. A method of treating aqueous solutions containing ammonium nitrate and fission products which comprises slowly adding the solution to an excess of hot acetic anhydride without external heating, heating the mixture to complete transformation of the ammonium nitrate, distilling the mixture, adding to the residue containing small volume of acetic anhydride and acetic acid, dilute nitric acid and distilling the mixture to destroy acetamide.

6. A method of treating aqueous solutions containing ammonium nitrate and fission products which comprises slowly adding the solution to an axcess of hot acetic anhydride without external heating, heating the mixture to complete transformation of the ammonium nitrate, distilling the remaining mixture to near dryness and adding nitrogen dioxide to the mixture containing small volume of acetic anhydride and acetic acid while distilling the mixture.

References Cited in the file of this patent

Weber: Journal of the Society of Chemical Industry, vol. 12, pp. 117–8 (1893).

Spath: Action of Acetic Anhydride on Nitrates, Chem. Abs., vol. 6, p. 1444 (1912).

Heilbron: Dictionary of Organic Compounds, revised edition (1943), vol. 1, page 5.